(12) United States Patent
Chen et al.

(10) Patent No.: US 12,500,743 B2
(45) Date of Patent: Dec. 16, 2025

(54) METHOD, ELECTRONIC DEVICE, AND PROGRAM PRODUCT FOR GENERATING TEXT CONTENT FOR MULTI-PARTY COLLABORATION

(71) Applicant: Dell Products L.P., Round Rock, TX (US)

(72) Inventors: Qiang Chen, Shanghai (CN); Sanping Li, Beijing (CN); Zijia Wang, London (GB); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/677,365

(22) Filed: May 29, 2024

(65) Prior Publication Data

US 2025/0337564 A1   Oct. 30, 2025

(30) Foreign Application Priority Data

Apr. 26, 2024 (CN) .......................... 202410516614.9

(51) Int. Cl.
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/3213* (2013.01)

(58) Field of Classification Search
None
See application file for complete search history.

(56) References Cited

FOREIGN PATENT DOCUMENTS

| CN | 116341562 A | * | 6/2023 | ............. G06F 40/30 |
| CN | 117113302 A | * | 11/2023 | ............. G06F 21/16 |

OTHER PUBLICATIONS

J. Kirchenbauer et al., "A Watermark for Large Language Models," arXiv:2301.10226v3, Jun. 6, 2023, 26 pages.

* cited by examiner

*Primary Examiner* — Bassam A Noaman
(74) *Attorney, Agent, or Firm* — Ryan, Mason & Lewis, LLP (57) ABSTRACT

A method in one embodiment includes acquiring a first public key and a first private key of a first user and a second public key and a second private key of a second user. The method further includes determining a first set from a glossary based on the first public key and the first private key, wherein the glossary is a set of a group of predefined tokens in a generative pre-training model. The method further includes determining a second set from the glossary based on the second public key and the second private key. The method further includes determining a set containing a plurality of tokens based on the first set and the second set. The method further includes generating text content by the generative pre-training model based on the set. According to embodiments of the present disclosure, a unique watermark can be formed in the generated text content.

20 Claims, 7 Drawing Sheets

METHOD, ELECTRONIC DEVICE, AND PROGRAM PRODUCT FOR GENERATING TEXT CONTENT FOR MULTI-PARTY COLLABORATION

RELATED APPLICATION

The present application claims priority to Chinese Patent Application No. 202410516614.9, filed Apr. 26, 2024, and entitled "Method, Electronic Device, and Program Product for Generating Text Content for Multi-Party Collaboration," which is incorporated by reference herein in its entirety.

FIELD

Embodiments of the present disclosure relate to a method, an electronic device, and a program product for generating text content for multi-party collaboration.

BACKGROUND

With the rapid development of generative models, such generative models increasingly possess strong contextual understanding ability and processing ability for multilingual and multimodal information. The generative models may be applied in fields such as machine translation, text generation, and intelligent question answering. In addition, generative models can also perform various natural language processing tasks such as text classification, named entity recognition, and sentiment analysis.

In some scenarios, content generated by a generative model may be widely spread and shared. Embedding a watermark in the generated content can provide the generated content with uniqueness and traceability, so that the source and ownership of the content can be determined. If no watermark is embedded, the generated content can be easily stolen or used without authorization by others.

SUMMARY

According to a first aspect of the present disclosure, a method is provided. The method includes acquiring a first public key and a first private key of a first user and a second public key and a second private key of a second user. The method further includes determining a first set from a glossary based on the first public key and the first private key, wherein the glossary is a set of a group of predefined tokens in a generative pre-training model. The method further includes determining a second set from the glossary based on the second public key and the second private key. The method further includes determining a set containing a plurality of tokens based on the first set and the second set. The method further includes generating text content by the generative pre-training model based on the set.

According to a second aspect of the present disclosure, an electronic device is provided. The electronic device includes at least one processor and a memory coupled to the at least one processor and having instructions stored therein. The instructions, when executed by the at least one processor, cause the electronic device to perform actions. The actions include: acquiring a first public key and a first private key of a first user and a second public key and a second private key of a second user; determining a first set from a glossary based on the first public key and the first private key, wherein the glossary is a set of a group of predefined tokens in a generative pre-training model; determining a second set from the glossary based on the second public key and the second private key; determining a set containing a plurality of tokens based on the first set and the second set; and generating text content by the generative pre-training model based on the set.

According to a third aspect of the present disclosure, a computer program product is provided. The computer program product is tangibly stored on a non-transitory computer-readable storage medium and comprises machine-executable instructions. The machine-executable instructions, when executed by a machine, cause the machine to perform actions comprising: acquiring a first public key and a first private key of a first user and a second public key and a second private key of a second user; determining a first set from a glossary based on the first public key and the first private key, wherein the glossary is a set of a group of predefined tokens in a generative pre-training model; determining a second set from the glossary based on the second public key and the second private key; determining a set containing a plurality of tokens based on the first set and the second set; and generating text content by the generative pre-training model based on the set.

BRIEF DESCRIPTION OF THE DRAWINGS

By the following Detailed Description of example embodiments of the present disclosure, provided herein with reference to the accompanying drawings, the above and other objectives, features, and advantages of the present disclosure will become more apparent, wherein identical reference numerals generally represent identical elements in the example embodiments of the present disclosure.

DETAILED DESCRIPTION

Illustrative embodiments of the present disclosure will be described in further detail below with reference to the accompanying drawings. While some specific embodiments of the present disclosure are shown in the accompanying drawings, it should be understood that the present disclosure may be implemented in various forms, and should not be viewed as being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

Adding a watermark to content generated by a generative model is an effective method to prevent malicious use of the generative model. For example, embedding identification information in generated content is a way to prove ownership, identify spam, track content source, and the like. When multiple users cooperate on some projects, how to generate text content that is confidential and can be embedded with watermarks from multiple parties is an urgent problem to be solved at present.

For this purpose, some embodiments of the present disclosure provide a method for generating text content for multi-party collaboration. The method may include acquiring a first public key and a first private key of a first user and a second public key and a second private key of a second user. The method further includes determining a first set from a glossary based on the first public key and the first private key, wherein the glossary is a set of a group of predefined tokens in a generative pre-training model. The method further includes determining a second set from the glossary based on the second public key and the second private key. The method further includes determining a set containing a plurality of tokens based on the first set and the second set. In addition, the method further includes generating text content by the generative pre-training model based on the set.

In this way, a plurality of asymmetric key pairs provided by a plurality of users can be implicitly embedded into the generated text content, thereby increasing the reliability of identifying and tracing the text content. In addition, in this way, it can be ensured that the various users can use their own asymmetric key pair to verify the ownership of the text content during multi-party collaboration. In addition, the various users in the multi-party collaboration can collaborate without knowing asymmetric keys of the other parties, while still being capable of verifying whether the asymmetric key provided by themselves is hidden in the text content.

Figure 1:
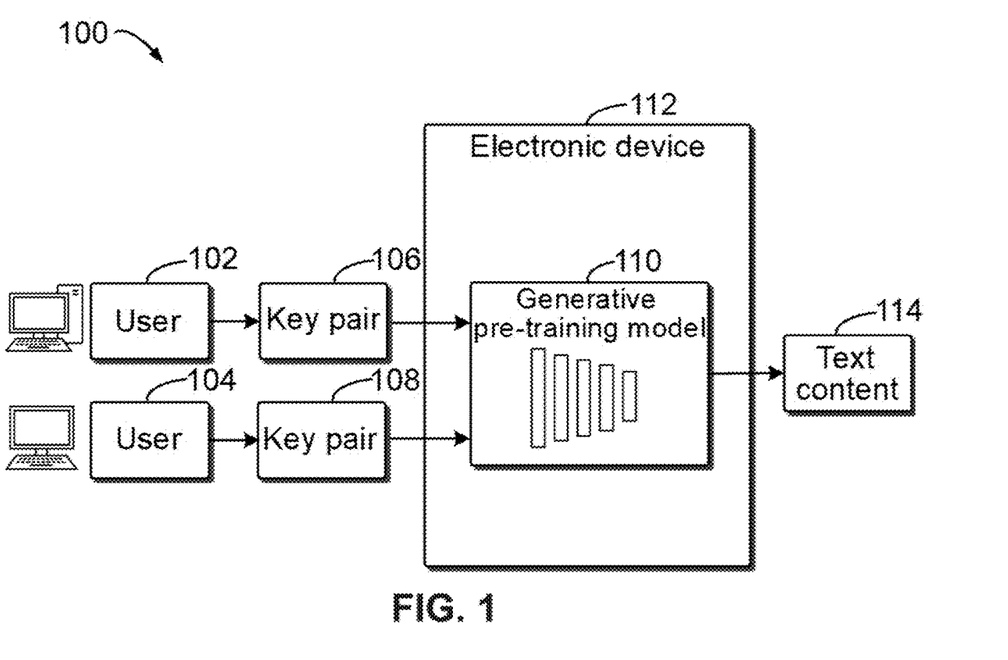
FIG. 1 is a schematic diagram of an example environment in which a device and/or a method according to some embodiments of the present disclosure can be implemented.

Fundamental principles and a plurality of example embodiments of the present disclosure will be described in detail below with reference to the accompanying drawings. FIG. 1 is a schematic diagram of an example environment 100 in which a device and/or a method according to embodiments of the present disclosure can be implemented.

FIG. 1 illustratively includes a user 102, a user 104, a key pair 106, a key pair 108, a generative pre-training model 110, an electronic device 112, and text content 114. It should be understood that the categories and quantity of models, data transmission processes, arrangements, and the like shown in FIG. 1 are merely illustrative, and the example environment 100 may include different quantities of models arranged in different manners, different quantities of data transmission processes, various additional elements, and so on. It should be understood that the above examples are only used to illustrate the application of the generative pre-training model 110. With the development of technologies, the generative pre-training model 110 may be included in various known or unknown applications in various fields and aspects.

In the example environment 100, the generative pre-training model 110 may be installed in any electronic device 112 having processing computing resources or storage resources. For example, the electronic device 112 may have common capabilities such as receiving and sending data requests, real-time data analysis, local data storage, and real-time network connectivity. The electronic device 112 may typically include various types of devices or servers. Examples of the electronic device 112 may include, but are not limited to: desktop computers, laptops, smartphones, wearable devices, security devices, intelligent manufacturing devices, smart home devices, Internet of things (IoT) devices, smart cars, drones, cloud servers, and so on, which are not limited in the present disclosure.

In some embodiments the present disclosure, the user 102 may input the key pair 106 on a corresponding terminal device based on work requirements or application scenarios. The key pair 106 may be an asymmetric key pair (public key/private key pair) used for asymmetric encryption. The public key in an asymmetric key pair may be made public, while the private key is generally not made public to maintain privacy and security. In some embodiments of the present disclosure, the public key may be set by the user 102 (for example, set to "0107"). The private key may be set by the user 102 or randomly generated by a key generation tool. The length and form of the randomly generated private key are not limited. It may be understood that the user 104 may also input the key pair 108 on a corresponding terminal device. The key pair 108 is similar to the key pair 106 and will not be further described here.

As shown in FIG. 1, in order to make the text content 114 generated by the generative pre-training model 110 implicitly embedded with the key pair 106 and the key pair 108, the key pair 106 and the key pair 108 may be input into the generative pre-training model 110, and the text content 114 used for indicating the key pair 106 and the key pair 108 may be generated by the generative pre-training model 110. The text content 114 is text generated by the generative pre-training model 110 based on contextual information, and the text contains a plurality of tokens.

In some embodiments of the present disclosure, the generative pre-training model 110 is a text-generating deep learning model that can be trained using data. In some embodiments, fine-tuning may be made to the generative pre-training model 110 so that the generative pre-training model can complete various natural language processing tasks, such as text generation, text question answering, and paper writing. The method of generating text content in some embodiments of the present disclosure will be illustrated in detail in the description of FIG. 2.

Figure 2:
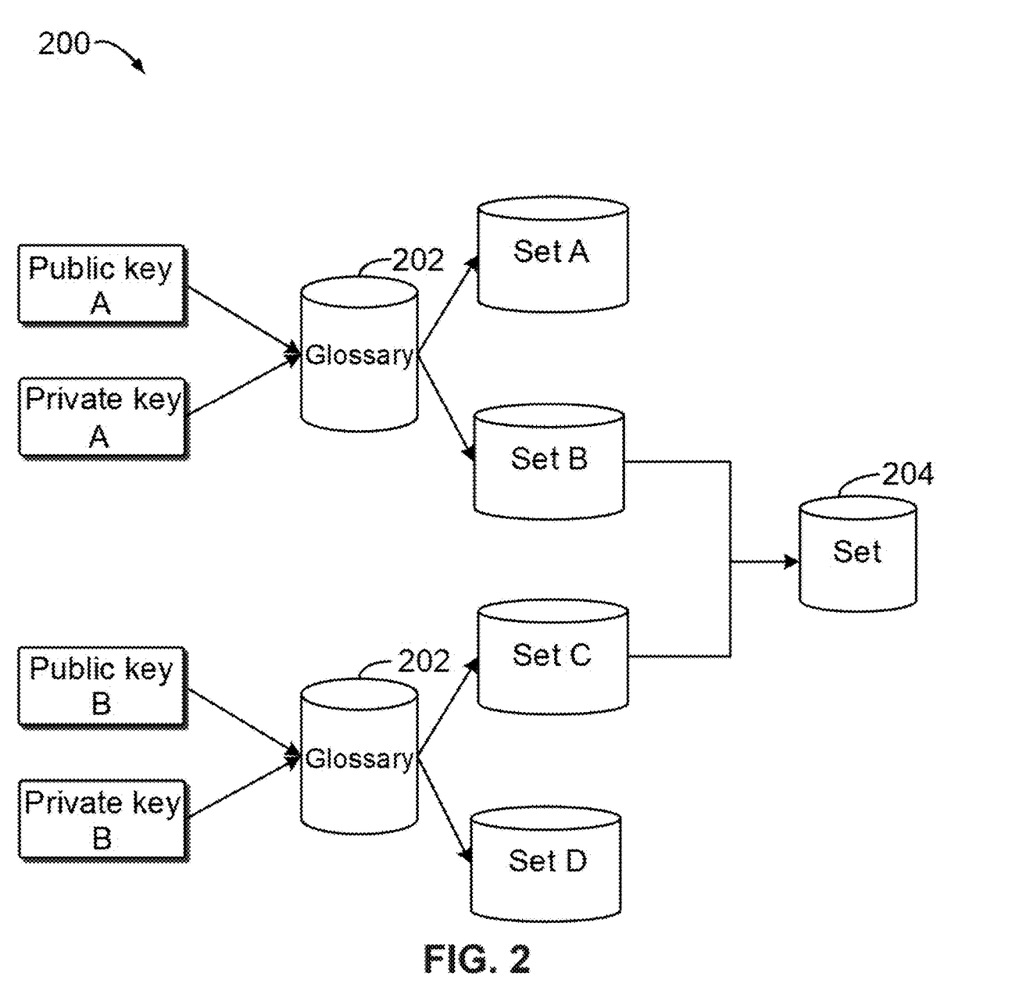
FIG. 2 is a schematic diagram of a process of generating text content by a generative pre-training model according to some embodiments of the present disclosure.

FIG. 2 is a schematic diagram of a process 200 for generating text content by a generative pre-training model according to some embodiments of the present disclosure. The method in FIG. 2 can be used to generate the text content 114 as shown in FIG. 1. As shown in FIG. 2, an asymmetric key pair includes a public key A and a private key A. Another asymmetric key pair includes a public key B and a private key B. In order to embed hidden watermarks in the text content, a glossary 202 may be partitioned based on asymmetric key pairs, so that most of the plurality of tokens contained in the text content come from a set obtained by the partitioning. In order to embed watermarks provided by a plurality of users in the text content, illustrative embodiments use a plurality of asymmetric key pairs provided by the plurality of users to partition the glossary.

As shown in FIG. 2, the glossary 202 may be partitioned based on the public key A and the private key A to obtain a set A and a set B. A random number generator related to the public key A and the private key A may be used to partition the glossary 202. For example, a corresponding hash value may be calculated based on the previous token (such as the last token in an input sequence or a token determined in the previous iteration) or the previous multiple tokens, the public key A, and the private key A. For example, a hash function may be used to calculate the hash value. The hash value may be a fixed-length numerical value used for representing the uniqueness of the input data.

In some embodiments of the present disclosure, a random number seeder may be initialized based on the hash value. The random number seeder may partition the glossary according to select (seed=hash ('AAA', S(−1), '123')), so as to obtain the set A and the set B, where AAA is the public key A, 123 is the private key A, and S(−1) is a fixed seed. It is to be understood that the probability of the tokens contained in the set B being selected is relatively high. The probability of the tokens contained in the set A being selected is relatively small. For example, in a case where the generative pre-training model is based on a transformer structure, responses of the plurality of tokens in the set B may be set to be greater than responses of the plurality of tokens in the set A.

As shown in FIG. 2, the glossary 202 may also be partitioned based on the public key B and the private key B to obtain a set C and a set D. The partitioning method is the same as the above, and similarly, the probability of tokens contained in the set C being selected is greater than the probability of tokens contained in the set D being selected. It is to be understood that if tokens contained in a final set are intended to be related to both the key pair A and the key pair B, a final set 204 may be determined according to an intersection between the set B and the set C. The tokens contained in the set 204 belong to both the set B and the set C.

In some embodiments of the present disclosure, after the set 204 is determined, a logarithmic probability of each token in the set B may be increased, for example, by n times. Afterwards, probability prediction may be performed on the entire glossary 202 to obtain a probability of each token (the probability of being selected as the next token). The next token is determined from the glossary 202 according to the prediction probability. For example, a softmax function may be used to predict the probabilities of various tokens in the glossary 202 being selected as the next token. According to the various probabilities, the token with the highest probability may be selected from the plurality of tokens as the next token. The token with the highest probability comes from the set 204 with a high probability. It should be understood that the determination of the further next token is the same as the determination of the next token, and two sets may be obtained by re-partitioning the glossary 202 according to two asymmetric key pairs. Afterwards, a new set is determined according to an intersection of the two sets to determine the further next token. Through this iterative method, the next token may be predicted at each time step until a termination symbol, such as a period or a special end marker, is encountered, thereby completing the generation of text content (such as the text content 114 in FIG. 1).

In this way, in scenarios where multi-party collaboration requires proof of ownership by multiple users, the generative pre-training model, when generating text, may implicitly embed a plurality of asymmetric key pairs provided by the multiple users into the generated text content, thereby providing a basis for multi-user authentication. On the other hand, watermarking with a plurality of asymmetric key pairs can increase the reliability of recognizing and tracing the text content. In addition, the various users in the multi-party collaboration may collaborate with each other without knowing asymmetric keys of the other parties, while still being capable of verifying whether the asymmetric key provided by themselves is hidden in the text content.

Figure 3:
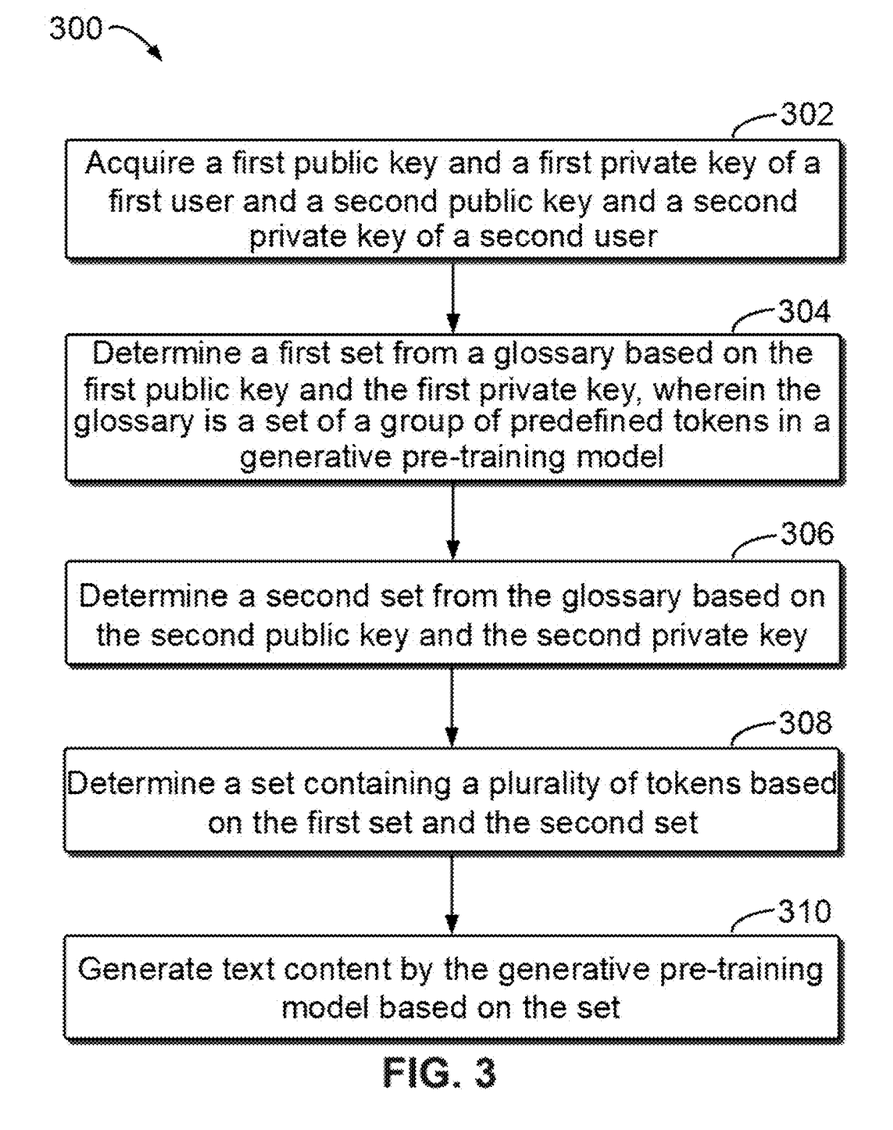
FIG. 3 is a flow chart of a method for generating text content for multi-party collaboration according to some embodiments of the present disclosure.

FIG. 3 is a flow chart of a method 300 for generating text content for multi-party collaboration according to an embodiment of the present disclosure. It should be noted that the method 300 according to embodiments of the present disclosure may be implemented, for example, at the electronic device 112 shown in FIG. 1, and more specifically at the generative pre-training model 110.

At a block 302, a first public key and a first private key of a first user and a second public key and a second private key of a second user are acquired. The first public key and the first private key may form an asymmetric key pair. Similarly, the second public key and the second private key may also form an asymmetric key pair. The public keys or the private keys may be data in different forms, such as numbers, strings, or binary data. The public keys or the private keys may be set by users according to their work needs or personal preferences. In some embodiments of the present disclosure, the public keys set by both parties may be the same or different.

At a block 304, a first set is determined from a glossary based on the first public key and the first private key, wherein the glossary is a set of predefined tokens in a generative pre-training model. In some embodiments of the present disclosure, in order to make the generated text content implicitly contain an asymmetric key pair of a first user to form a special watermark, a first set that meets requirements may be determined by partitioning the glossary based on the asymmetric key pairs provided by the first user. For example, a random number generator initialized based on the first asymmetric key pair may be utilized to partition the glossary to obtain the first set. Tokens contained in the first set are all obtained by filtering by utilizing the first asymmetric key pair and are associated with the first asymmetric key pair.

In some embodiments of the present disclosure, a glossary is a set of all words and phrases that a generative pre-training model can understand and generate, which determines a language range that the model can understand and generate. The glossary may be a mapping table pre-established by the generative pre-training model, which maps each possible token to a unique piece of identification information (such as a numerical ID). The generative pre-training model may distinguish different tokens based on the identification information. In order to make the generated text content implicitly contain keys to form special watermarks, the glossary may be partitioned based on a plurality of asymmetric key pairs to determine the set that meets requirements. Therefore, most of the tokens contained in the generated text content come from the set.

At a block 306, a second set is determined from the glossary based on the second public key and the second private key. In some embodiments of the present disclosure, in order to make the generated text content implicitly contain an asymmetric key pair of a second user to form a special watermark, the glossary may be partitioned based on the asymmetric key pair provided by the second user to determine a second set that meets requirements. It is to be understood that tokens contained in the second set are all obtained by filtering by using the second asymmetric key pair and are associated with the second asymmetric key pair.

At a block 308, a set containing a plurality of tokens is determined based on the first set and the second set. It is to be understood that in order to associate the tokens contained in the finally determined set with both the first asymmetric key pair and the second asymmetric key pair so that the watermark contained in the finally generated text content is associated with both the first user and the second user and both the first user and the second user can recognize and trace the source of the text content, the final set may be determined based on an intersection of the first set and the second set. The tokens contained in the set belong to both the first set and the second set.

At a block 310, the generative pre-training model generates text content based on the set. The generative pre-training model may increase a logarithmic probability of each token in the set, thereby increasing a probability of each token in the set being selected as the next token. In this way, most of the plurality of tokens contained in the text content generated by the generative pre-training model come from the set. In this way, when verifying the text content to determine its source, corresponding keys may be inferred based on a set composed of most tokens in the text content, thereby determining the source of the text content. In other words, the watermark contained in the generated text content is determined according to two asymmetric key pairs, implicitly indicating two asymmetric key pairs.

It is to be understood that the first user and the second user may have a cooperative relationship, and in a collaborative scenario, both parties embed their respective watermarks in the text content generated by the generative pre-training model, so that both parties can recognize and trace the source of the text content in different scenarios. In the process of embedding the watermark, neither party knows the private key of the other party, and it is basically impossible to know exactly what the watermark of the other party is. This enhances the privacy and security of the watermarks, and also allows for effective cooperation among multiple parties.

In some embodiments of the present disclosure, the glossary may be partitioned to obtain the corresponding first set or second set by utilizing both the public key and the private key simultaneously. For example, a random number generator may be initialized according to the public key and the private key, and the glossary may be randomly partitioned by utilizing the random number generator to obtain the corresponding first set or second set. In one example, the random number generator may use select (seed=hash ('AAA', S(−1), '123')) to filter the glossary to obtain the first set, where AAA is the public key A, 123 is the private key A, and S(−1) is a fixed seed. In some other embodiments of the present disclosure, the glossary may be partitioned by utilizing a public key to obtain a first candidate set or second candidate set, and the candidate set may be further partitioned by utilizing the private key to obtain the final first set or second set.

In some embodiments of the present disclosure, in addition to representing tokens obtained by filtering through key pairs in the form of sets, filtering results may also be represented in the form of masks on the glossary. The mask may be a Boolean mask. The Boolean mask is a binary array that has the same shape or the same length as a data array (the binary array may only contain 0 and 1). In some embodiments of the present disclosure, elements in the Boolean mask may be used to select or highlight certain elements in a glossary (for example, tokens in the glossary).

In some embodiments of the present disclosure, each element in the Boolean mask may correspond to a token in the glossary. If an element in the Boolean mask is 1, the corresponding token will be filtered to the first set or second set, which means that an original probability of the token in a current time step may be increased, that is, a probability of the token being selected as the next token is relatively high. If an element in the Boolean mask is 0, the corresponding token is filtered out and will not be placed in the set or candidate set, and a probability of the token being selected as the next token is very low.

Based on this, in some embodiments of the present disclosure, a Boolean Mask A on the glossary may be determined by utilizing a public key A and a private key A of a user A. A Boolean Mask B on the glossary may be determined by utilizing a public key B and a private key B of a user B. A final set may be determined based on the Boolean Mask A and the Boolean Mask B. In some embodiments of the present disclosure, an AND operation may be performed on the Boolean Mask A and the Boolean Mask B to determine the final set. For example, if an element in the Boolean Mask A and a corresponding element in the Boolean Mask B (such as the element at the same position) are both 1, the element may be placed in the set to generate text content.

Figure 4:
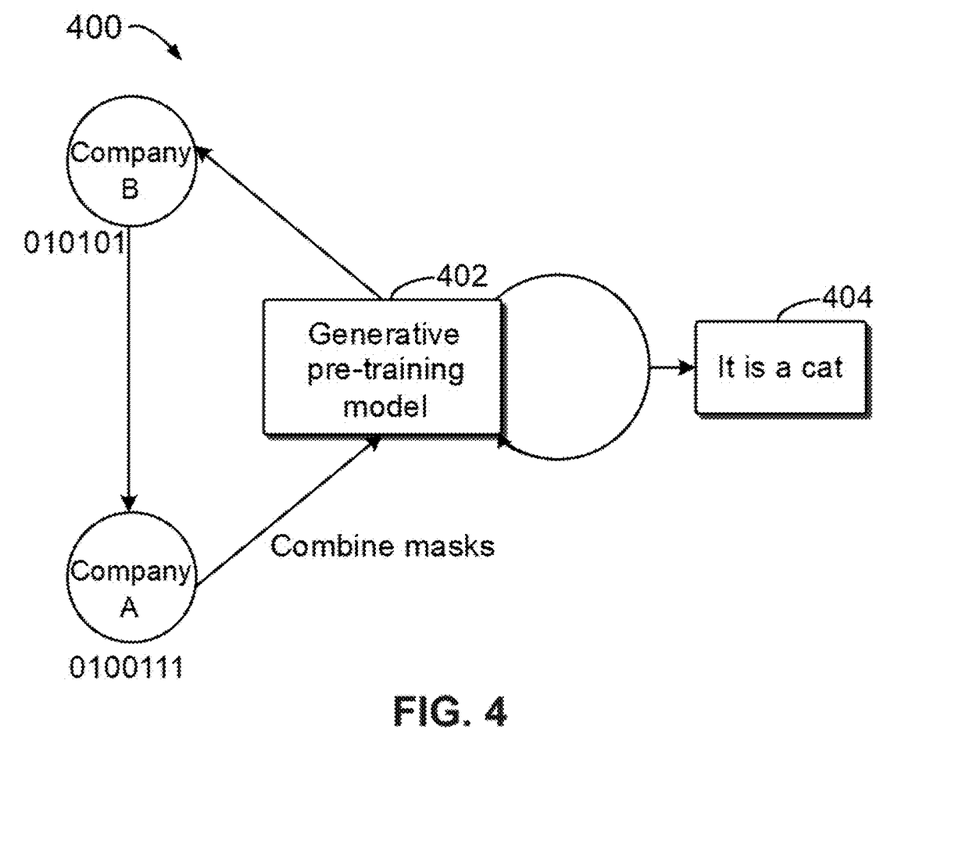
FIG. 4 is a schematic diagram of a process for generating text content according to some embodiments of the present disclosure.

FIG. 4 is a schematic diagram of a process 400 for generating text content according to some embodiments of the present disclosure, and more particularly for determining a set by utilizing masks according to some embodiments of the present disclosure.

As shown in FIG. 4, a company A and a company B are working together on a certain project. The company A hopes to embed its unique watermark into the generated text content to represent its ownership of the text content. The company B also hopes to embed its unique watermark into the generated text content to represent its ownership of the text content. Based on this, a mask on a glossary may be generated based on an asymmetric key pair provided by the company B, and the mask may be sent to the company A for subsequent watermark embedding work of the company A. The company A may generate another mask on the glossary based on an asymmetric key pair provided by itself.

In some embodiments of the present disclosure, the mask may be merged with another mask to determine a final mask. A generative pre-training model 402 may determine a set containing a plurality of tokens based on the final mask and the pre-set glossary, so that most of the tokens contained in the generated text content 404 come from the set, thereby implicitly embedding asymmetric key pairs provided by the company A and the company B in the generated text content 404.

It should be understood that a user B sometimes does not want a user A to know his/her own key (such as a private key and/or a public key), and only needs to ensure that the user A can correctly detect a source of the text content with his/her own key. Therefore, in some embodiments of the present disclosure, a private key in an asymmetric key of the user B may be set as a randomly changing key, for example, the private key of the user B may be a randomly generated string. In this way, in an iteration process of using the public key and the private key of the user B to partition the glossary to obtain the first set, since the private key is random and not fixed, the first set obtained by partitioning also differs in each iteration process. In this way, another user cannot infer the key of the user B based on the results of a plurality of rounds of glossary partitioning, thereby increasing the difficulty for other unauthorized users to crack and abuse the watermark.

In addition, only setting the private key of the user B to randomly change does not affect the ability of the user A to correctly decrypt with the corresponding key, nor does it affect the ability of the user A to identify and trace the source of the text content. The user B may also use his/her own public key to perform decryption correctly. By introducing randomness and a one-time private key, the security of the embedded watermark is enhanced. This helps protect the generated text content from being accessed or abused by unauthorized users.

In some embodiments of the present disclosure, a candidate set may be determined normally according to the public key. Afterwards, a random string (<random string>) may be added to a hash function so that a seed of the random number generator differs each time, and therefore, a set determined from the candidate set also differs each time. For example, the set may be determined from the candidate set by the manner of select (seed=hash('AAA', S(−1), <random string>)), where 'AAA' is a public key, and S(−1) is a fixed seed or sequence.

In this way, a watermark embedded in each generated text content is different. An unauthorized user can recognize and verify the watermark in the text content only when knowing the public key and the random string generated each time, thereby increasing the difficulty of inferring the public key.

In some embodiments of the present disclosure, both parties (such as the first user and the second user) involved in the cooperation may each set a different public key (for example, the first public key and the second public key, and the first public key and the second public key may be different). On the premise of mutual trust, both parties may share the public keys (for example, the first user may inform the second user of the first public key, and the second user may inform the first user of the second public key). In this way, both parties involved in the cooperation may verify the source of the text content through the known public keys.

In other embodiments of the present disclosure, both parties involved in the cooperation may also select a shared public key as their respective public key (that is, the first public key and the second public key are the same). Afterwards, the first set and the second set may be determined according to the set determination methods described in the above embodiments. It is to be understood that since the first public key and the second public key are the same, a first candidate set and a second candidate set obtained by partitioning are very likely the same, or masks on a glossary obtained by using the first public key and the second public key are very likely the same. In this way, both parties may use the same public key to verify the source of the text content.

In some embodiments of the present disclosure, in order to prevent unauthorized users with watermark cracking experience from recognizing the embedded hidden watermark in the text content, a plurality of methods may be used to increase the freedom of embedding the hidden watermark and increase the difficulty of watermark cracking. For example, in a process of determining the candidate set from the glossary, the criteria or principles of screening are changed due to the need to re-determine the corresponding candidate set or set based on the key pair at each time step of determining the next token. Based on this, in some embodiments of the present disclosure, a random number generator may be initialized based on a public key and a hash value of a predetermined number of tokens. According to the initialized random number generator, the glossary may be filtered to determine the corresponding candidate set. The predetermined number may be set by the user, and the predetermined number for each time step may be the same or different. In one example, the predetermined number may be 3. In other words, the first candidate set may be determined from the glossary according to the public key and the hash value of the first 3 tokens.

In this way, due to the fact that the basis for determining the hash value is not fixed each time text content is generated (for example, the hash value may be determined based on the first 3 tokens this time, and the hash value may be determined based on the first 5 tokens the next time), an unauthorized user can hardly infer the public key or private key by multiple times of observing and analyzing the hidden watermark embedded in the text content, so that it is more difficult to predict or guess the original key, thereby increasing the difficulty for the unauthorized user to crack and abuse the watermarks, and ensuring the integrity and security of the text content.

In some embodiments of the present disclosure, in addition to using a plurality of tokens (the number of tokens is non-fixed) to determine the hash value, the length of a seeding sequence of the random number generator may also be used as a variable, which can further increase the quantity of possibilities of determining a set from the candidate set. In other words, the length of the seeding sequence is not fixed, but a variable that may vary within a certain range. Due to the significant increase in the number of potential combinations, more computing resources and time are needed to try all possible combinations. This variability increases the computational resources and time required to predict or crack hidden watermarks embedded in the text content. It is to be understood that both changing the number of tokens that determine the hash value and changing the length of the seeding sequence enhance the security of the watermarks by increasing the complexity and uncertainty.

In some embodiments of the present disclosure, most of the tokens contained in the text content come from the determined set. The set is the intersection of the first set and the second set, which means that the set is a strict subset of the two sets. Therefore, both parties can use their own public keys and private keys or only use the public keys to verify the text content. It is to be understood that in the process of verifying or generating the text content, neither party knows the details of the watermark of the other party, and it is also difficult to parse and obtain the keys of the other party based on the content exchanged in the generation process.

Figure 5:
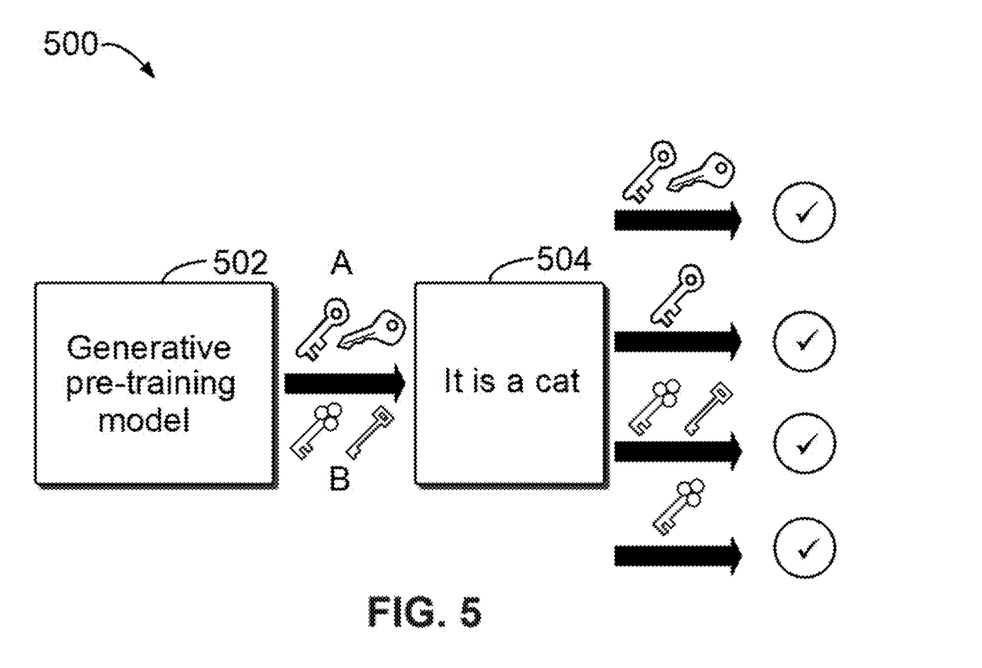
FIG. 5 is a schematic diagram of a process for verifying text content according to some embodiments of the present disclosure.

FIG. 5 is a schematic diagram of a process 500 for verifying text content according to some embodiments of the present disclosure. As shown in FIG. 5, a generative pre-training model 502 generates text content 504 that meets requirements based on an asymmetric key pair A provided by a user A and an asymmetric key pair B provided by a user B. The text content 504 has the asymmetric key pair A and the asymmetric key pair B implicitly embedded therein. Both the user A and the user B can use their own keys to verify a source of the text content. For example, both parties can verify the existence of their watermarks through a combination of public key and private key, or only through the public key.

As shown in FIG. 5, if a verification key pair (a public verification key and a private verification key) used for verification is the same as the asymmetric key pair A indicated in the text content 504, the verification is successful. If the verification key is the same as the public key A indicated in the text content 504, the verification is successful. If the verification key pair (the public verification key and the private verification key) used for verification is the same as the asymmetric key pair B indicated in the text content 504, the verification is successful. If the verification key is the same as the public key B indicated in the text content 504, the verification is successful.

In some embodiments of the present disclosure, an algorithm for embedding watermarks may be used to determine text content for multi-party collaboration. For example, the algorithm may acquire a plurality of preceding tokens (such as $s^{(-Np)} \ldots s^{(t-1)}$, and for each time point t (determining the next token), the following steps (step 602 to step 616 of FIG. 6 as described below) may be repeated to determine the next token.

Figure 6:
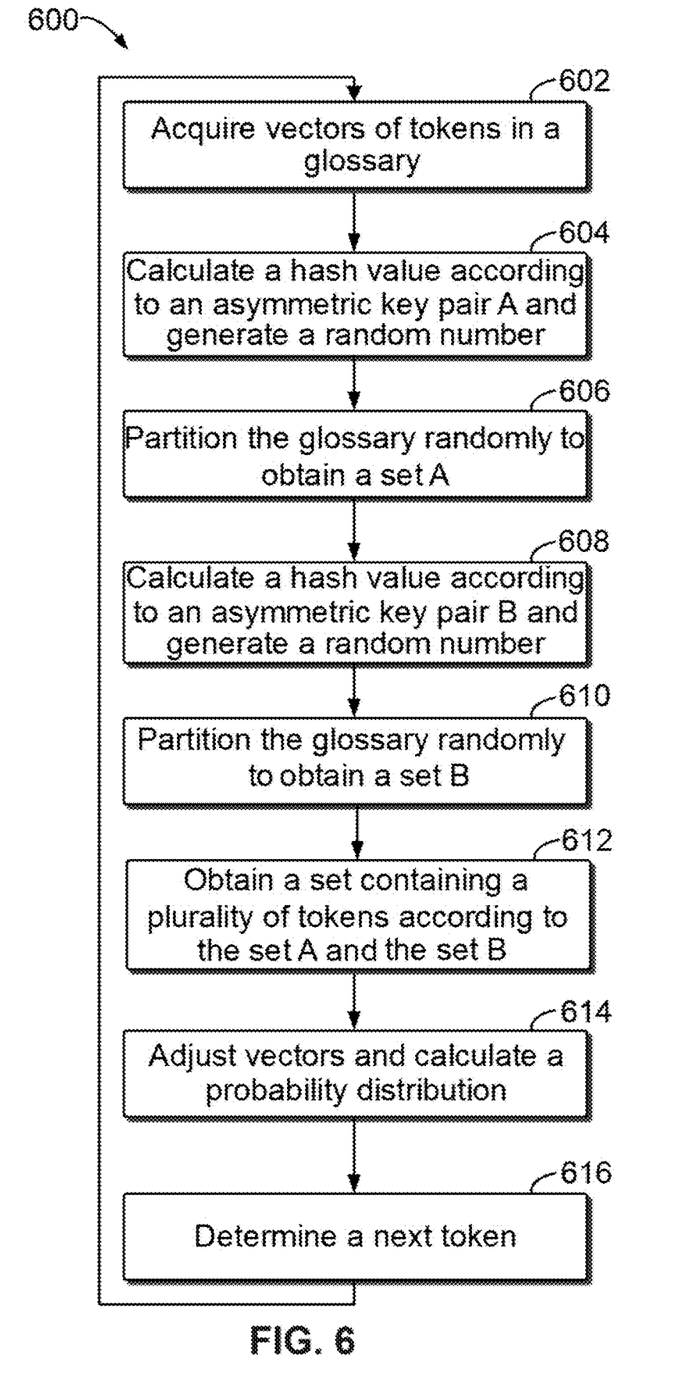
FIG. 6 is a flow chart of a method for determining text content by utilizing an algorithm according to some embodiments of the present disclosure.

FIG. 6 is a flow chart of a method 600 for determining text content by utilizing an algorithm according to some embodiments of the present disclosure. In the step 602, a generative pre-training model is utilized to determine a logit vector l(t) for each word in the glossary based on a plurality of preceding tokens. The logit vector is an output of the generative pre-training model before being processed by a softmax function, which may be regarded as an original score or logarithmic probability.

In the step 604, a hash processing may be performed on the asymmetric key pair A (the private key A and the public key A) and the previous token $s^{(t-1)}$, and the determined hash value may be used as the seed for the random number generator. In the step 606, the random number generator is utilized to partition the entire glossary, so as to obtain a set in a size of $\gamma_{Apub}\gamma_{Apri}|V|$ to serve as the set A, wherein $\gamma_{Apub}$ is a scale factor corresponding to the public key A, $\gamma_{Apri}$ is a scale factor corresponding to the private key A, and $|V|$ is the total size of the glossary.

In the step 608, a hash processing is performed by using the asymmetric key pair B (the private key B and the public key B) and the previous token $s_{(t-1)}$, and the determined hash value is used as the seed for the random number generator. In the step 610, the entire glossary is partitioned by utilizing the random number generator, so as to obtain a set in a size of $\gamma_{Bpub}\gamma_{Bpri}|V|$ to serve as the set B, wherein $\gamma_{Bpub}$ is a scale factor corresponding to the public key B, and $\gamma_{Bpri}$ is a scale factor corresponding to the private key B.

In the step 612, a set containing a plurality of tokens may be determined according to an intersection of the set A and the set B. In the step 614, logit vectors of the plurality of tokens in the set may be adjusted, for example, the logit vector of each token in the set may be increased by 8. Afterwards, the probability distribution of various tokens in the entire glossary may be calculated. For example, a softmax operation may be applied to the glossary to obtain a probability distribution. This probability distribution reflects the probability of each token being selected given the context and the key pair.

In the step 616, according to the prediction probability of each token, the next token may be sampled from the glossary. For example, the token with the highest prediction probability is selected as the next token s(t). It is to be understood that after the sampling process at the current time t ends, the procedure proceeds to the sampling process at the next time t+1. By repeating the step 602 to the step 616 above, a series of tokens may be generated until a stop condition is met (for example, the length of the output sequence reaches the maximum generation length). The text content used for indicating the key may be determined through the series of tokens.

Figure 7:
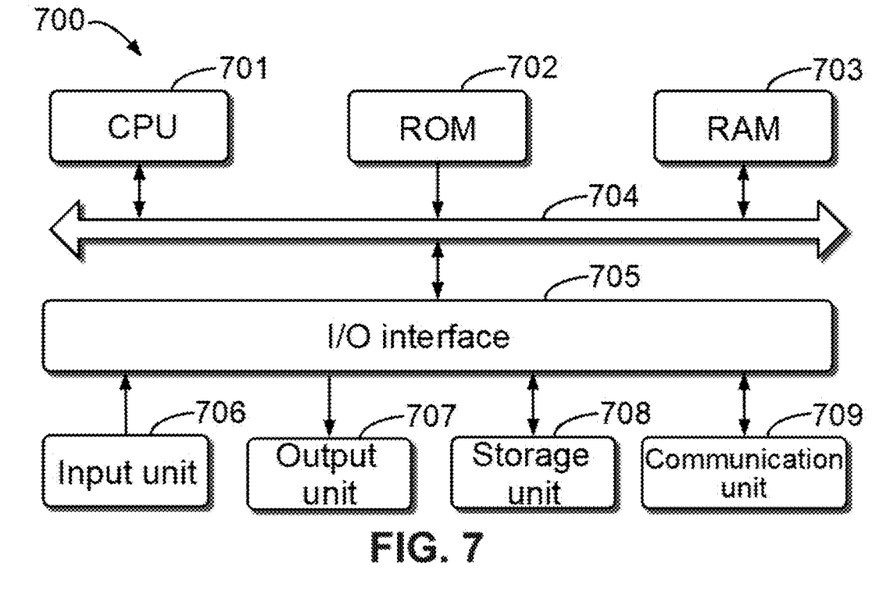
FIG. 7 shows a block diagram of an example device that can be used to implement embodiments of the present disclosure.

FIG. 7 is a block diagram of an example device 700 which can be used to implement embodiments of the present disclosure. The electronic device in FIG. 1 can be implemented using the device 700. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; the storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, such as the method 300, may be performed by the CPU 701. For example, in some embodiments, the method 300 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 300 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, apparatus (system), and computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or block diagrams. These computer-readable program instructions may also be stored in a computer-readable storage medium, and cause a computer, a programmable data processing apparatus, and/or other devices to function in a particular manner, so that the computer-readable medium having the instructions stored thereon includes an article of manufacture including instructions for implementing various aspects of the functions/acts specified in one or more blocks in the flow charts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:
   acquiring a first public key and a first private key of a first user and a second public key and a second private key of a second user;
   determining a first set from a glossary based on the first public key and the first private key, wherein the glossary is a set of a group of predefined tokens in a generative pre-training model;
   determining a second set from the glossary based on the second public key and the second private key;
   determining a set containing a plurality of tokens based on the first set and the second set; and
   generating text content by the generative pre-training model based on the set;
   wherein generating the text content by the generative pre-training model based on the set comprises:
   determining a next token in a current time step based on a prediction probability of a plurality of tokens in the glossary; and
   generating the text content based on the next tokens in a plurality of time steps.

2. The method according to claim 1, wherein determining the set containing a plurality of tokens comprises:
   determining the set containing a plurality of tokens based on an intersection of the first set and the second set.

3. The method according to claim 1, wherein determining the first set from the glossary based on the first public key and the first private key comprises:

determining a first candidate set from the glossary based on the first public key; and
determining the first set from the first candidate set based on the first private key.

4. The method according to claim 3, wherein determining the first candidate set from the glossary based on the first public key comprises:
initializing a random number generator based on the first public key and a hash value of a predetermined number of tokens in the generative pre-training model; and
determining the first candidate set from the glossary based on the initialized random number generator, wherein a seeding sequence length of the random number generator is random.

5. The method according to claim 3, wherein the first private key is a random string, and determining the first set from the first candidate set comprises:
determining a seed of a random number generator by using a hash function based on the random string; and
determining the first set from the first candidate set based on the random number generator with the seed determined.

6. The method according to claim 1, further comprising:
setting, by the generative pre-training model, an original probability of the tokens contained in the set to increase by a preset multiple.

7. The method according to claim 1, further comprising:
determining a first mask on the glossary based on the first public key and the first private key;
determining a second mask on the glossary based on the second public key and the second private key; and
determining the set containing a plurality of tokens by combining the first mask and the second mask.

8. The method according to claim 7, wherein each of the first mask and the second mask comprises a Boolean mask, and the combining comprises performing a logical AND operation on the first mask and the second mask.

9. The method according to claim 1, wherein the first private key or the second private key is a random key, and the first public key and the second public key are the same or different.

10. An electronic device, comprising:
at least one processor; and
memory coupled to the at least one processor and having instructions stored therein, wherein the instructions, when executed by the at least one processor, cause the electronic device to perform actions comprising:
acquiring a first public key and a first private key of a first user and a second public key and a second private key of a second user;
determining a first set from a glossary based on the first public key and the first private key, wherein the glossary is a set of a group of predefined tokens in a generative pre-training model;
determining a second set from the glossary based on the second public key and the second private key;
determining a set containing a plurality of tokens based on the first set and the second set; and
generating text content by the generative pre-training model based on the set;
wherein generating the text content by the generative pre-training model based on the set comprises:
determining a next token in a current time step based on a prediction probability of a plurality of tokens in the glossary; and
generating the text content based on the next tokens in a plurality of time steps.

11. The electronic device according to claim 10, wherein the actions further comprise:
determining the set containing a plurality of tokens based on an intersection of the first set and the second set.

12. The electronic device according to claim 10, wherein the actions further comprise:
determining a first candidate set from the glossary based on the first public key; and
determining the first set from the first candidate set based on the first private key.

13. The electronic device according to claim 12, wherein the actions further comprise:
initializing a random number generator based on the first public key and a hash value of a predetermined number of tokens in the generative pre-training model; and
determining the first candidate set from the glossary based on the initialized random number generator, wherein a seeding sequence length of the random number generator is random.

14. The electronic device according to claim 12, wherein the first private key is a random string, and the actions further comprise:
determining a seed of a random number generator by using a hash function based on the random string; and
determining the first set from the first candidate set based on the random number generator with the seed determined.

15. The electronic device according to claim 10, wherein the actions further comprise:
setting, by the generative pre-training model, an original probability of the tokens contained in the set to increase by a preset multiple.

16. The electronic device according to claim 10, wherein the actions further comprise:
determining a first mask on the glossary based on the first public key and the first private key;
determining a second mask on the glossary based on the second public key and the second private key; and
determining the set containing a plurality of tokens by combining the first mask and the second mask.

17. The electronic device according to claim 16, wherein each of the first mask and the second mask comprises a Boolean mask, and the combining comprises performing a logical AND operation on the first mask and the second mask.

18. The electronic device according to claim 10, wherein the first private key or the second private key is a random key, and the first public key and the second public key are the same or different.

19. A computer program product tangibly stored on a non-transitory computer-readable storage medium and comprising machine-executable instructions, wherein the machine-executable instructions, when executed by a machine, cause the machine to perform actions comprising:
acquiring a first public key and a first private key of a first user and a second public key and a second private key of a second user;
determining a first set from a glossary based on the first public key and the first private key, wherein the glossary is a set of a group of predefined tokens in a generative pre-training model;
determining a second set from the glossary based on the second public key and the second private key;
determining a set containing a plurality of tokens based on the first set and the second set; and
generating text content by the generative pre-training model based on the set;

wherein generating the text content by the generative pre-training model based on the set comprises:

determining a next token in a current time step based on a prediction probability of a plurality of tokens in the glossary; and generating the text content based on the next tokens in a plurality of time steps.

20. The computer program product according to claim 19, wherein the actions further comprise:

determining the set containing a plurality of tokens based on an intersection of the first set and the second set.

* * * * *